US006988705B1

(12) United States Patent
Hoose (10) Patent No.: US 6,988,705 B1
(45) Date of Patent: Jan. 24, 2006

(54) FLUENT CONTROL VALVE

(76) Inventor: Karl V. Hoose, P.O. Box 3, Waterboro, ME (US) 04087

( * ) Notice: Subject to any disclaimer, the term of this patent is extended or adjusted under 35 U.S.C. 154(b) by 10 days.

(21) Appl. No.: 10/663,404

(22) Filed: Sep. 15, 2003

Related U.S. Application Data

(60) Provisional application No. 60/413,208, filed on Sep. 24, 2002.

(51) Int. Cl.
*F04B 49/00* (2006.01)
(52) U.S. Cl. .................................. 251/120; 137/115.13
(58) Field of Classification Search ................ 251/118, 251/120–124, 127; 137/115.13
See application file for complete search history.

(56) References Cited

U.S. PATENT DOCUMENTS 3,841,350 A * 10/1974 Griensteidl et al. .... 137/516.27
3,975,116 A * 8/1976 Feild et al. ................. 417/311
6,708,905 B2 * 3/2004 Borissov et al. ............ 239/584
2002/0117644 A1 * 8/2002 Carrillo et al. ........ 251/129.08
2003/0062495 A1 * 4/2003 Long et al. ................. 251/122

* cited by examiner

*Primary Examiner*—J. Casimer Jacyna
(74) *Attorney, Agent, or Firm*—Patricia M. Mathers; Thomas L. Bohan (57) ABSTRACT

A continuously variable fluent control valve for controlling supersonic flow of gas. The valve has an upper plate with a very slightly angled physical control surface and a lower plate with a physical nozzle inlet. As the valve opens and closes during supersonic flow, a hydrodynamic pintle forms in the nozzle inlet just below the physical control surface. The hydrodynamic pintle provides a fluid control surface for redirecting flow from horizontal flow to vertical flow through the nozzle and, depending on the expansion needs of the supersonic flow, the hydrodynamic pintle changes shape, expanding or shrinking in the axial direction of the valve. Because of the nearly flat physical control surface of the upper plate, matieral ablation is significantly reduced. The fluid-fluid boundary between the hydrodynamic pintle and the supersonic flow produces a flow through the nozzle with little or no recirculation.

10 Claims, 7 Drawing Sheets

FIG. 6 of the invention

FLUENT CONTROL VALVE

This utility patent application claims priority under 35 U.S.C. 119(e) from application 60/413,208, filed on Sep. 24, 2002, the subject matter of which is herein incorporated by reference.

BACKGROUND INFORMATION

1. Field of the Invention

The invention relates to the field of fluid control valves. More particularly, the invention relates to fluid control valves for regulating supersonic gas flow.

2. Description of the Prior Art

The purpose of a supersonic flow valve, for example, a thruster valve in a rocket booster or divert thruster, is to align the momentum of fluid flow with the direction of the desired thrust. During optimal performance, all the velocity components of the fluid flow are aligned with the direction of flight or thrust. Vectored flow, that is, flow that has velocity components at an angle relative to the direction of flight, will produce a vectored thrust. Also, if the flow is not properly aligned and turbulence or flow separation occurs, the separation will dissipate kinetic energy in the flow, thus reducing the velocity and the amount of thrust obtained from the fuel.

Conventional valves used to control supersonic fluid flow typically have a cone-shaped pintle, typically a 45-degree cone, that seats in the orifice of the nozzle. When the valve closes, the pintle stops flow through the orifice; when it opens, the pintle not only allows fluid to flow into the nozzle, but also provides a boundary surface that serves to align the velocity components of the fluid flow. Depending on the particular application, the boundary surface is shaped to guide the flow toward the nozzle exit, with the least amount of losses due to friction and/or flow separation.

Figure 1A:
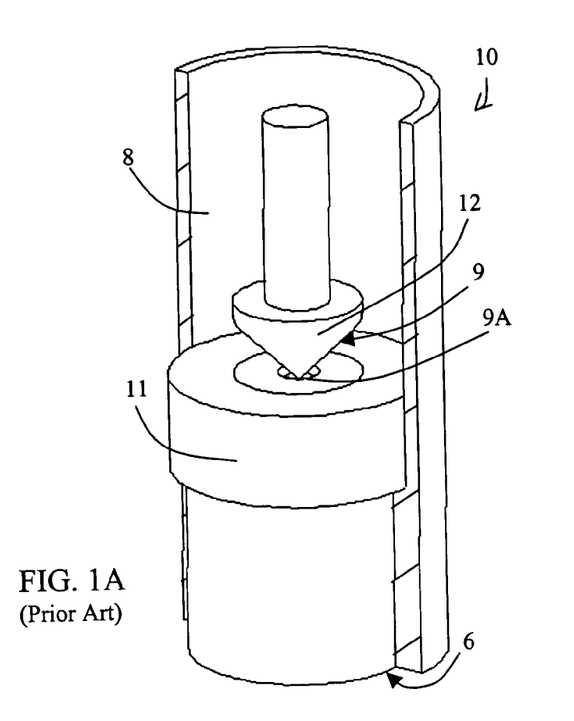
FIG. 1A is a perspective view of a traditional flow control valve with a 45-degree cone-shaped pintle and nozzle (prior art).

Several disadvantages are inherent with the use of a 45-degree pintle in applications of supersonic fluid flow. First and foremost is the problem of material ablation in such pintles as a result of rapid heat transfer from the fluid to the tip of the pintle. FIGS. 1A–3C listed below are illustrations of the typical construction and flow conditions within a conventional 45-degree pintle valve. FIG. 1A is a perspective view and FIG. 1B a cross-sectional view of the convention 45-degree valve, showing the pintle and the nozzle. FIGS. 2A–3C are color graphs of computational fluid dynamics analyses of fluid flow, whereby it is noted that the pintle is shown facing upward instead of downward as in FIGS. 1A, 1B, and that fluid flow through the nozzle is toward the upper end of the graph. FIG. 2A illustrates temperature (T) conditions, FIG. 2B illustrates presssure (P) conditions, and FIG. 2C illustrates Mach (M) conditions in the valve during fluid flow.

Color and color gradations are indicators of a change in the respective P, T, and M conditions, with red representing a maximum condition, and dark blue a minimum condition. A shock wave is indicated by the color yellow. In FIGS. 2A and 2B, the 45-degree pintle valve is shown fully open, providing a throat in the area between the pintle and the inlet to the nozzle. A shock wave arises as a result of the rapid expansion of the fluid as it flows into the nozzle. FIGS. 2A and 2B show two areas of high pressure and high temperature, respectively. The first area of high temperature/high pressure is located in the plenum of the valve and ends at the edge of the nozzle inlet. This first area contributes largely to the high heat flux in the nozzle and leads to a high rate of material ablation and erosion at the nozzle inlet. The second area is situated directly at the tip of the pintle. This area is particularly problematic due to the high surface to volume ratio of material at the tip of the pintle to the amount of heat being transferred from the fluid to the pintle. Because of this, the material at the tip rapidly melts away, thereby drastically changing the geometry of the flow control surface. Any change in geometry results in a rapid deterioration of thruster performance. In some conventional valves, the tip of the pintle and the nozzle inlet are coated with rhenium, a metal capable of withstanding the high temperatures generated in such a valve. Although rhenium can minimize the material ablation in the valve, it has disadvantages in that it is an extremely heavy material and also very expensive and difficult to obtain.

Accurate alignment of the 45-degree pintle and nozzle orifice is a critical aspect of good performance of the conventional 45-degree pintle valve in supersonic flow control applications. Any misalignment of the pintle leads to significant performance degradation. For example, if the pintle is off-center, flow will be greater on one side of the orifice, resulting in a higher pressure on that side. The gas under the higher pressure will tend to flow into areas of lower pressure, causing secondary flow fields with their inherent energy losses due to additional heating and separation. Furthermore, vibrational excitations emanating from the structure/vehicle may also cause a misalignment of the pintle, which, if the pintle and nozzle touch, may result in catastrophic failure of the valve.

The fact that the 45-degree pintle is a rigid mass situated in the flow path is a further disadvantage. The fluid flow is forced along the boundary surface of the pintle as it passes through the throat, resulting in loss of kinetic energy in the flow due to friction against the boundary surface. Also, gaseous fluids are often contaminated with solid particles. These solid particles, being heavier than the gas particles, collide with the pintle and nozzle, abrading and eroding the boundary surface and exacerbating the material ablation resulting from heat transfer.

There are many applications for booster or thruster valves in which it is critically important that the fluid flow be precisely controlled. One example is the use of fluid flow valves in missile defense systems in which a seeker component of a missile system locks onto the flight path of an in-coming hostile missile, with the purpose of intercepting the flight path and destroying the missile. Currently, the valve technology in such guidance and seeker systems uses the traditional pintle design and nozzle. Typically, these valves operate in the full-on and full-off positions, and consequently, are pulsed as a means of precisely controlling the mass flow of the hot gases and, thus, the thrust. In some applications, these cone pintles are easily operable in an on-off mode because the stroke length (actuation length) is so long. Due to the severe weight and space constraints that are typically applied to the construction of vehicles in a missile system, operating a thruster valve in pulse-mode has disadvantages that affect accuracy and cost of the missile system. For example, the pulsing produces significant structural vibrations that severely hamper the operation and performance of the high-precision components in the guidance and seeker systems on the vehicle. Consequently, the seeker housing has to be vibrationally isolated from the body of the vehicle in order to maintain proper performance, and this is technically a difficult and costly task.

Another type of known valve includes a pintle that is very slightly angled, about 2°25′, rather than having the 45-degree type pintle discussed above. U.S. Pat. No. 3,975,116 (Feild; issued 1976) teaches such a valve for hydraulic operations. A severe disadvantage of the Feild device for supersonic flow applications is that it teaches a straight-edge nozzle inlet (orifice), that is, a 90° drop-off at the edge of the orifice. The rate of expansion is uncontrolled with such a sudden drop-off, making the device unsuitable for use with supersonic fluid flow.

What is needed, therefore, is a fluid control valve that provides enhanced valve performance and a longer operational life. What is further needed is such a valve that reduces heat transfer loads in the nozzle throat region, reduces kinetic energy losses, and optimizes the flow path. What is yet further needed is such a control valve that minimizes response time and reduces the power required to actuate the valve. What is still yet further needed is such a device that reduces vibrational stress on surrounding system components.

BRIEF SUMMARY OF THE INVENTION

For the above cited reasons, it is an object of the present invention to provide a continuously variable valve that is suitable for controlling supersonic fluid flow, and that provides enhanced performance and a longer operational life. It is a further object of the invention to provide such a valve that reduces heat transfer loads in the nozzle throat region, reduces kinetic energy losses, and optimizes the flow path. It is a yet further object to provide such a control valve that minimizes response time, minimizes kinetic energy losses, and enables precise control of fluid flow through the valve without imparting vibrational stress to surrounding system components.

The objects are achieved by providing a variable fluent control valve (FCV) comprising two circular plates—a fluid control plate with a very slightly angled physical flow control surface (FCS) and a nozzle plate that includes a physical nozzle having a physical nozzle inlet (PNI). The fluid control plate is arranged opposite the nozzle plate in a plenum into which fluid enters at high pressure and high temperature from one or more fluid ports. Generally, the fluid is in a gasified state before it enters the plenum and hereinafter, when discussing fluid flow through the FCV, it will be understood that the fluid is primarily in a gaseous state which may contain some contamination in the form of solid particles.

The FCS on the fluid control plate is a key feature of the invention. This FCS has a very small angle relative to the horizontal plane of the major diameter of the fluid control plate, such that, at any particular position of the FCV, the distance between the fluid control and nozzle plates at the outer perimeter of the fluid control plate is greater than the distance between the two plates at the physical nozzle inlet (PNI). The fluid control plate may be translatable in an axial direction relative to a fixed nozzle plate for metering the flow through the nozzle, or both plates may be adapted to translate axially. Due to a pressure differential across the FCV, when the FCV is open, the fluid flows from the plenum into a nozzle throat area between the fluid control plate and the nozzle plate in a plane substantially parallel to that of the surface of the nozzle plate, radially from the outer perimeter of the two plates toward the PNI.

A unique feature of the FCV according to the present invention is that a "hydrodynamic pintle" or "hydrodynamic control surface" forms in the center of the PNI that adapts to the expansion needs of the fluid during supersonic flow. Unlike traditional pintles that are rigid, solid components, the hydrodynamic pintle provides a flow control surface the shape of which adapts dynamically to the nozzle configuration and FCV opening. The flow area between the plates decreases as the fluid flows evenly and radially inward toward the PNI, resulting in increased fluid velocity. The fluid-fluid interaction that takes place as fluid flows from all sides toward the center of the PNI gives rise to the hydrodynamic pintle which redirects the flow direction of the fluid 90° toward the nozzle exit, i.e., in a direction substantially parallel to the axial direction. This hydrodynamic control surface (HCS) changes shape in the course of valve operation, becoming longer or shorter, or disappearing as the FCV opens and closes, thereby providing a hydrodynamic wall or control surface that effectively serves to redirect the fluid flow down toward the nozzle exit. Hereinafter, the "hydrodynamic control surface" or "hydrodynamic pintle" will be referred to as the HCS, regardless of its instantaneous shape.

In normal operation, the FCV opens and closes in rapid succession, thereby opening and closing a nozzle throat with a flow area that is constantly changing. The flow velocity of the fluid changes as the flow area of the nozzle throat changes, and the changes in flow velocity effect changes in the flow pressure and temperature. In supersonic flow, flow velocity increases as the flow area increases. The fluid closest to the nozzle plate expands in area rapidly as it flows through the narrow nozzle throat region into the expanding PNI, resulting in a higher Mach number flow in an area of lower pressure, whereby Mach number=(velocity of fluid flow)/(local speed of sound). The fluid in the plenum flows with even distribution around the perimeter of the fluid control plate toward the center of the PNI. Fluid flowing into the PNI from one direction collides in the center with fluid flowing into the PNI from other directions, causing an area of recirculation to form, the size and shape of which is dependent upon the expansion needs of the fluid. Studies have shown that the HCS is generally a recirculation region that remains relatively stable in the center of the PNI, increasing and decreasing somewhat in dimension in the axial direction of the FCV as the FCV opens and closes. At the higher openings, the HCS may cease being a recirculation region and become merely an area of higher pressure fluid and low subsonic flow. The boundary of the HCS separates supersonic flow from subsonic flow in the PNI. In other words, the HCS effectively provides a hydrodynamic "pintle" that adapts to the momentary configuration of the FCV.

As the fluid flows into the PNI, it is redirected toward the nozzle exit by the flow control surface of the FCV, which includes the physical FCS of the fluid control plate and the HCS. The velocity of the fluid increases as it flows through the nozzle throat into the PNI, due to the increasing area downstream from the throat region, and continues to increase as it is redirected down toward the nozzle exit due to the greater expansion in the flow area of the nozzle. A normal shock wave forms in the throat region as a result of the increasing velocity and, as the fluid flows through this shock wave, the pressure and temperature of the fluid drop significantly and the velocity becomes supersonic. The drop in temperature and pressure reduces the heat transfer to the nozzle. The temperature of the fluid near the center of the flow is the hottest, but this fluid only comes into contact with the HCS and the FCS on the fluid control plate. The FCS, being relatively flat compared to the 45-degree cone-tip of the traditional pintle, provides a much lower surface to volume ratio to amount of heat transfer than does the 45-degree cone tip and, therefore, provides reduced heat loads over that of the traditional pintle. The fluid is in contact with a much reduced surface area of the FCV, be it with the physical FCS or the physical nozzle, and, as a result, the physical nozzle absorbs less energy from the fluid flow and the physical FCS can better withstand the heat transfer loads. The material ablation of the nozzle and, above all, of the physical FCS, is greatly reduced, thereby increasing the operational life of the FCV. Furthermore, the reduced energy absorption improves the performance of the FCV. In addition, in solid-propellant rocket motors, the flow path helps direct solid particles toward the center of the nozzle and away from the nozzle walls. The solid particles are heavier than the fluid and, as the direction of flow changes, their momentum causes them to collide in the center of the nozzle, away from the walls, where they are redirected downward toward the nozzle exit. Thus, the HCS at the center of the PNI prevents the particles from impinging on the surfaces of the physical FCS and the physical nozzle walls, thereby minimizing or eliminating significant erosion problems encountered in traditional pintle nozzles.

Computational fluid dynamic analyses of fluid flow in the FCV according to the invention and in traditional pintle valves show significant differences in uniformity of flow. In traditional pintle valves, flow near the tip of the 45-degree pintle is subsonic, i.e., has a low Mach number, and this subsonic flow extends far down into the center of the nozzle. By contrast, supersonic flow in the FCV according to the invention is much more uniform across the nozzle below the HCS and at the nozzle exit, the velocity components of the flow are in alignment with the direction of thrust, and pressure and temperature are significantly lower at the PNI in the throat region and along the nozzle wall. The HCS flattens out as the FCV opens, and becomes more cone-shaped as the FCV closes, and, depending on the expansion needs of the fluid as it flows into the nozzle and is re-directed 90° toward the nozzle exit, the HCS may eventually disappear. The FCV according to the invention effectively lengthens the nozzle by extending it up into the area between the two plates, while simultaneously enabling the use of a physically smaller nozzle. This provides two advantages. For one, having a longer effective control surface results in better flow alignment. For another, the use of a physically shorter, smaller nozzle, made possible by the essentially flat configuration of the fluid control plate, allows a reduction in the weight and size of the FCV. The shape of the HCS is determined by the radius of the physical FCS (R2), the radius of the nozzle throat (R1), and the radius of the PNI (curved nozzle wall entering the physical nozzle). The optimum FCV design defines a nozzle inlet radius that provides the proper rate of fluid expansion to maintain a sufficiently low temperature in the fluid flow next to the nozzle wall for the particular application.

Computational fluid dynamic (CFD) analysis indicates that the FCV produces a flow with minimal to no recirculation (beyond that of the HCS) within the valve. Hence, the FCV will dramatically improve the flow control, and consequently, the maneuverability and reliability of missiles and other vehicles that require very precise attitude and heading control. This improved performance of the FCV also effects substantial savings in vehicle weight.

Secondary flowfields that are generated within the plenum chamber are damped before entering the inlet to the FCS. These secondary flowfields are known to increase heat transfer and ablation significantly in pintle or traditional style supersonic nozzles. The damping of these flowfields minimizes the heat transfer and ablation of the nozzle and valve materials. This characteristic of the FCV allows the utilization of lower cost and lighter weight materials than do the traditional 45-degree pintle valves.

In rocket thruster applications, such as kinetic kill vehicles for missile defense, the FCV according to the invention, with its "hydrodynamic pintle" or HCS, eliminates thrust variations due to vibrations in the system. In the traditional design, a vibrating or off-axis pintle effects changes in the flow path that result in changes in the thrust and exacerbates the problem of ablation and erosion of the nozzle throat and pintle. By contrast, an off-axis or vibrating FCS according to the present invention does not affect the flowpath through the nozzle. Hence, the design requirements regarding rigidity and alignment of the vehicle structure can be relaxed, thereby reducing the cost of fabricating variable thrust rocket motors.

The FCV according to the invention has been studied in hydraulic applications and the following characteristics have been observed. The pressure drop across the FCV is much lower than in traditional pintle valves because of the absence of recirculation and flow separation. Thus, the FCV is much quieter in operation. Flow control is linear with opening of the FCV, down to essentially zero mass flow. Hence, the FCV provides a nearly infinite turn-down ratio and, consequently, serves as a very precise flow meter.

The response time of the FCV has been shown to be extremely fast in hydraulic applications. This is due to the very short stroke length required to move the FCV from full open to completely closed. Inherent in the design of a traditional pintle valve is that the pintle, to open the valve to the same degree, travels a greater distance than does a flat or nearly flat surface. That is, the stroke length of the FCV between full-open position and full-close position is shorter than the necessary stroke length in a traditional pintle valve between full-open and full-close positions. Minimizing the stroke length results in a quicker response time and also requires less power to actuate the FCV. Also contributing to the reduced power requirements to actuate the FCV is the fact that, because of the slight angle on the FCS relative to the surface of the nozzle, fluid at line pressure fills the space between the fluid control plate and nozzle plate when the FCV closes the exit nozzle entrance.

Further, the FCV according to the invention is extremely resistant to wear, even when the fluid is contaminated with solid particles. This further supports the findings of minimal turbulence and recirculation within the FCV. All of these observations are indications of superior performance potential for the FCV in supersonic fluid flow applications.

Experiments have been carried out with the FCV according to the invention under conditions of cold flow and hot flow, relevant to actual rocket thruster conditions, with regard to temperature and pressure, low pressure, subsonic and supersonic gas flow. The results show that the mass flow versus valve opening is linear with subsonic and supersonic flow throughout the FCV for constant plenum pressure conditions. Two-dimensional and three-dimensional CFD analysis has also been conducted on the FCV. In the case of supersonic flow, the FCV continues to show a linear relationship between mass flow and valve opening. A normal shock wave appears between the physical FCS and the nozzle inlet surface, whereby the opening of the FCV controls the height of the throat area, and therefore, of the normal shock. Hence, the valve opening controls the mass flow and, therefore, the overall thrust of the system. This provides the capability of precisely controlling the mass flow or thrust through the nozzle. In addition, the flow remains uniform throughout the nozzle, unlike in traditional plug or pintle type nozzles in which supersonic flow occurs near the nozzle walls and subsonic flow extends far down into the center of the nozzle.

Because the normal shock occurs between the FCS and the nozzle plate, the nozzle length actually extends 90 degree up around the radiused corner of the inlet onto the surface of the nozzle plate. This allows the overall physical length of the nozzle to be shortened, making a much more compact thruster.

BRIEF DESCRIPTION OF THE DRAWINGS

The application as filed contains at least one drawing executed in color. Color drawings will be provided with copies of this patent or patent application publication by the Office upon request and payment of the necessary fee.

DETAILED DESCRIPTION OF THE PREFERRED EMBODIMENT

The computational flow dynamic (CFD) illustrations submitted with this application are color graphs, whereby the various temperatures, pressures, and Mach conditions are indicated by colors and color gradations. In all illustrations, the highest values are indicated by the color red and the lowest values by the color blue. A normal shock wave is generally indicated by the color yellow.

Figure 1B:
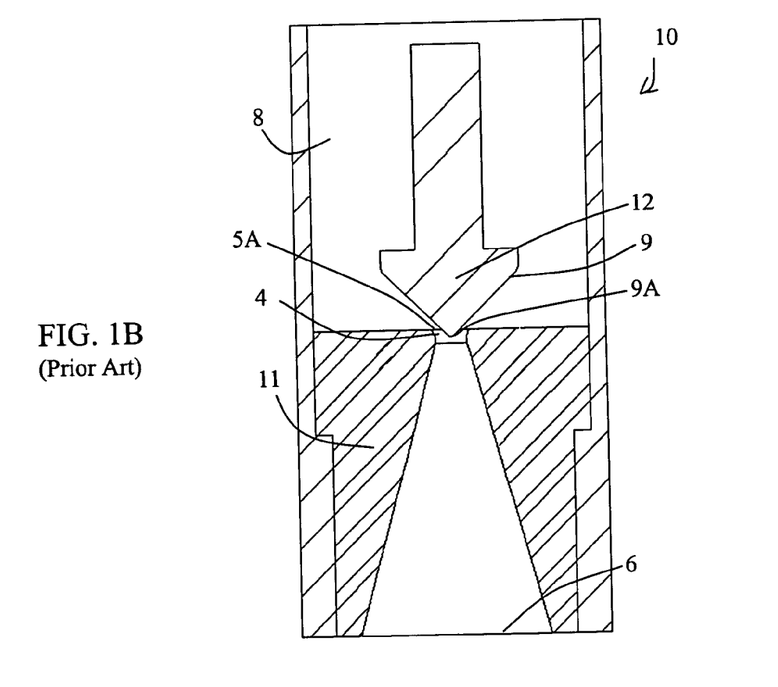
FIG. 1B is a side view of the control valve of FIG. 1A.
Figure 2A:
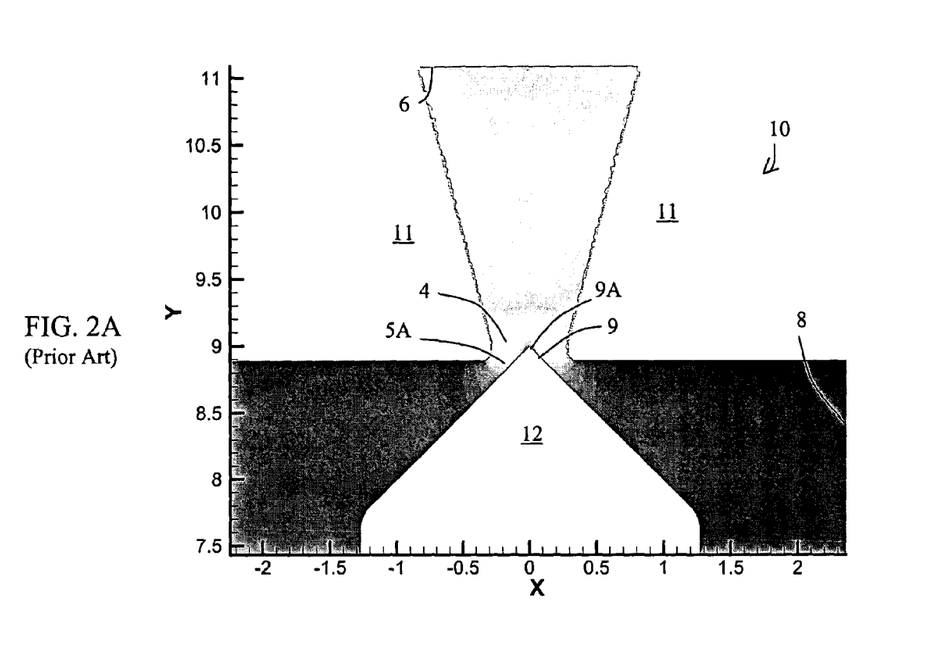
FIG. 2A is a CFD color graph of the temperature regions in a traditional 45-degree pintle valve that is 80% open (prior art).
Figure 2B:
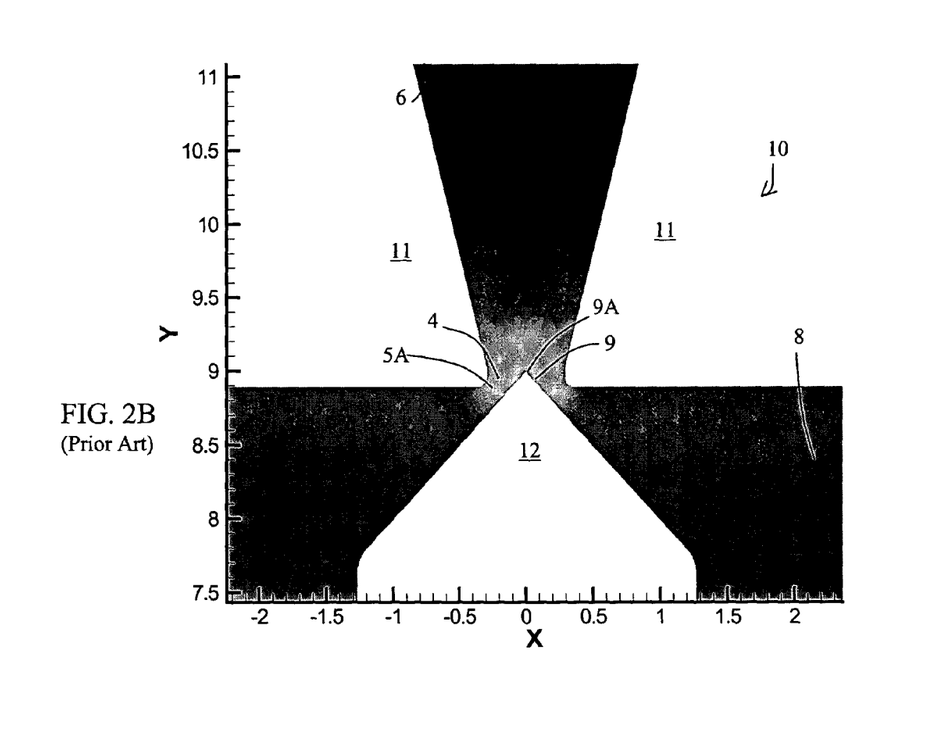
FIG. 2B is a CFD color graph of the pressure regions in a traditional 45-degree pintle valve that is 80% open (prior art).
Figure 2C:
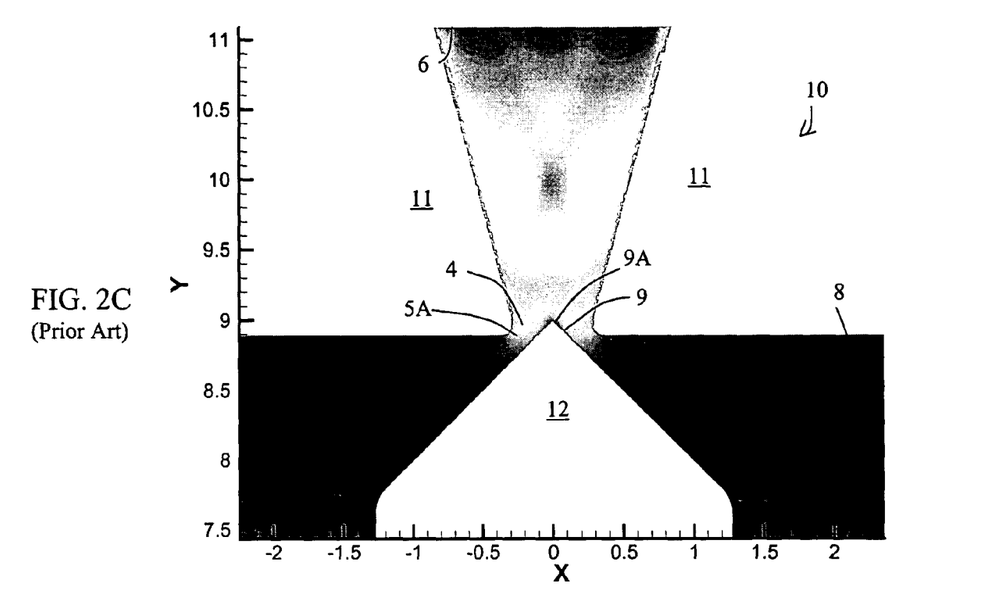
FIG. 2C is a CFD color graph of the Mach number distribution in the fluid flow of a traditional 45° valve (prior art).

FIGS. 1A and 1B illustrate a traditional 45-degree valve 10 with a nozzle 11, a 45-degree pintle 12, a valve plenum 8. The valve is traditionally set into a housing which locates the nozzle and pintle into position. The nozzle 11 has an upper surface 11A, a nozzle inlet 4 and a nozzle exit 6, and the pintle 12 has a tip 9A. The portion of the pintle 12 that extends into the fluid flow provides a fluid control surface 9 that redirects the flow direction toward the nozzle exit 6. A fluid dynamic throat 5A forms between the nozzle inlet 4 and the pintle 12 as the valve 10 opens.

Figure 3A:
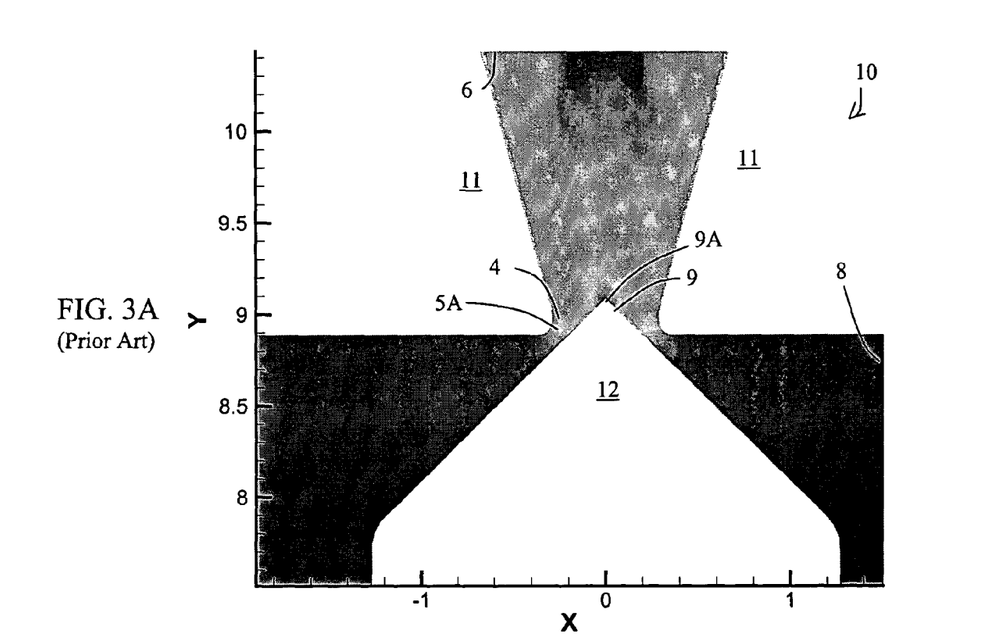
FIG. 3A is a CFD color graph of the temperature regions in a traditional 45-degree pintle valve that is 60% open (prior art).
Figure 3B:
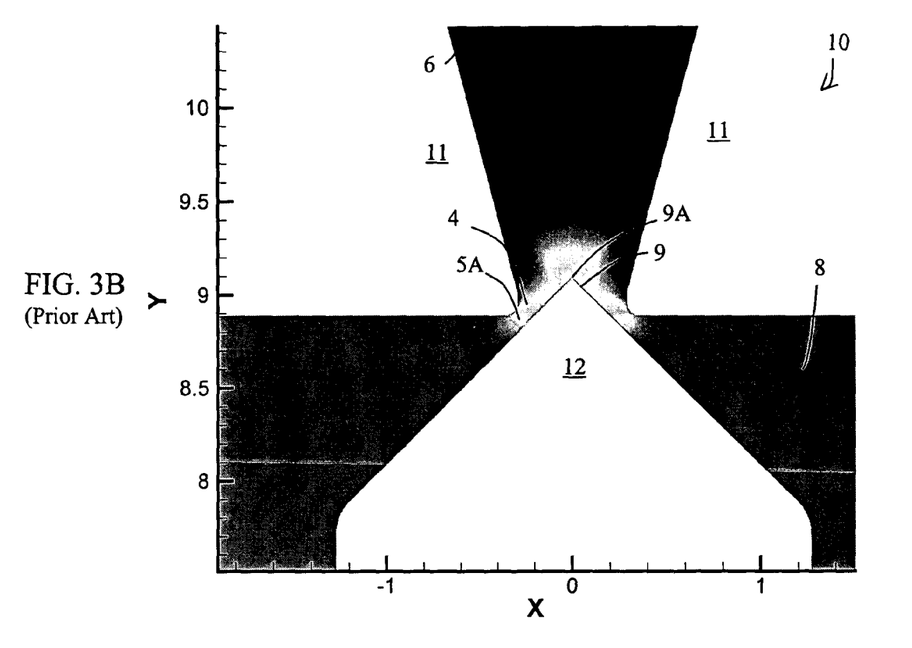
FIG. 3B is a CFD color graph of the pressure regions in a traditional 45-degree pintle valve that is 60% open (prior art).
Figure 3C:
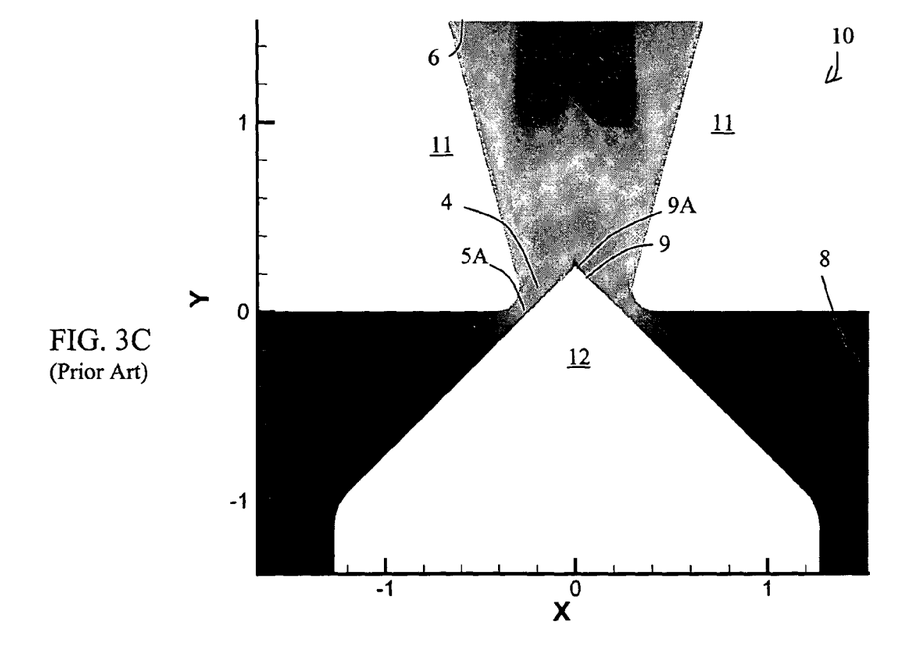
FIG. 3C is a CFD color graph of the Mach distribution in a traditional 45-degree pintle valve that is 60% open (prior art).

FIG. 2A and FIG. 2B illustrate the temperature and pressure regions, respectively, in the valve 10 when it is 90% open; FIG. 2C shows the regions of sonic, subsonic and supersonic fluid flow in the valve 10. FIGS. 3A–3C illustrate analogously the temperature, pressure, and Mach conditions of the valve 10 when the valve is 60% open. As seen in FIGS. 2A and 2B, the fluid in the plenum 8 is at high temperature and high pressure, both of which decrease gradually as the fluid flows toward the nozzle inlet 4 and impinges on the fluid control surface 9 of the 45-degree pintle 12. The flow path toward the nozzle inlet 4 is bounded by the upper surface 11A and the fluid control surface 9 and is contracting as it approaches the nozzle inlet 4.

The ratio of the surface area of the fluid control surface 9 to the volume of the traditional pintle 12 is at its greatest at the tip 9A. As shown in the FIGS. 2A–3C, an area of very high temperature and very high pressure forms at the tip 9A downstream of a primary shock wave that forms in the fluid dynamic throat 5A, even though the temperature and pressure of the fluid decrease as the fluid passes through the primary shock wave. This significantly increases the heat transfer into the pintle 12 via control surface 9. Because of this, the tip 9A is subject to extreme wear and material ablation during operation of the valve 10 and must be replaced frequently. Also, as the material is ablated, the geometry of the fluid control surface 9 changes, leading to significant deterioration in valve performance, which results in decreased precision and fuel efficiency.

Figure 4A:
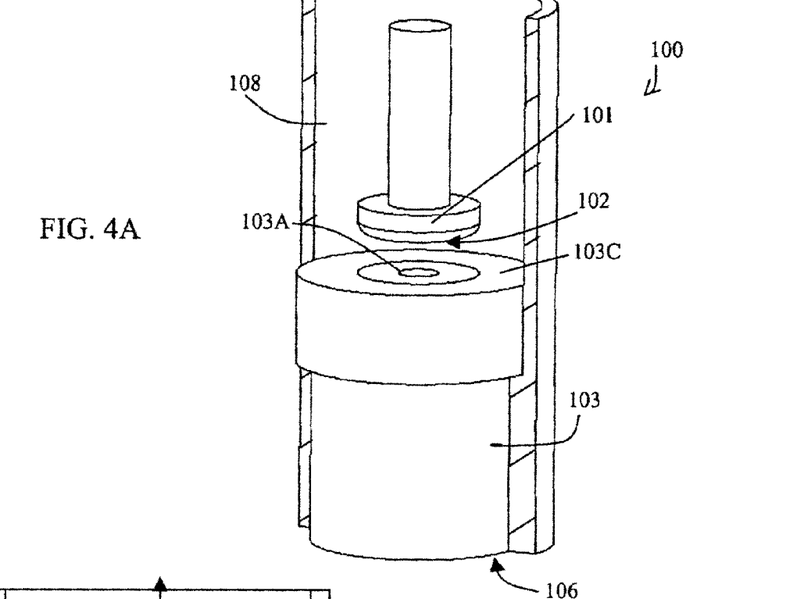
FIG. 4A is a perspective view of the Preferred Embodiment of the fluent control valve (FCV) according to the invention, showing a nozzle and a flow control surface (FCS) having only a very slight angle.
Figure 4B:
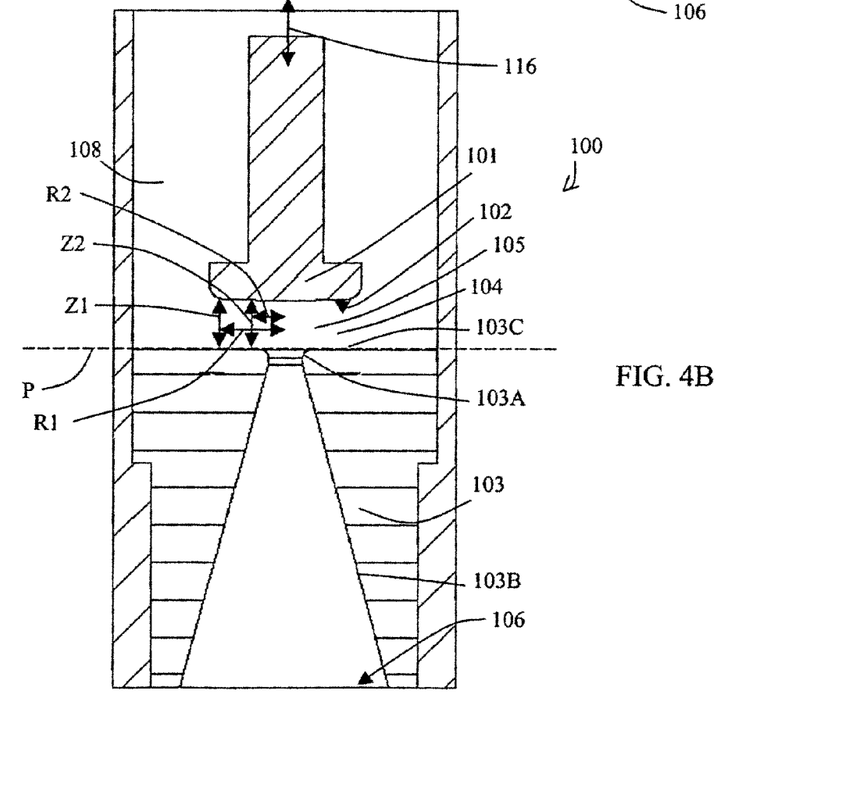
FIG. 4B is a side view of the fluent control valve (FCV) of FIG. 4A.
Figure 5A:
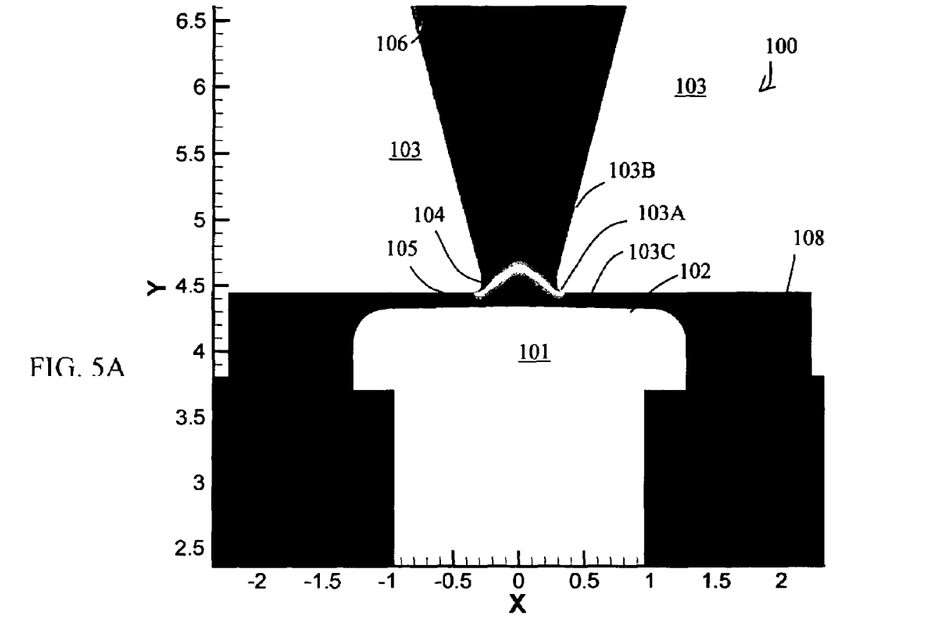
FIG. 5A is a CFD color graph of the temperature regions in the FCV according to the invention.
Figure 5B:
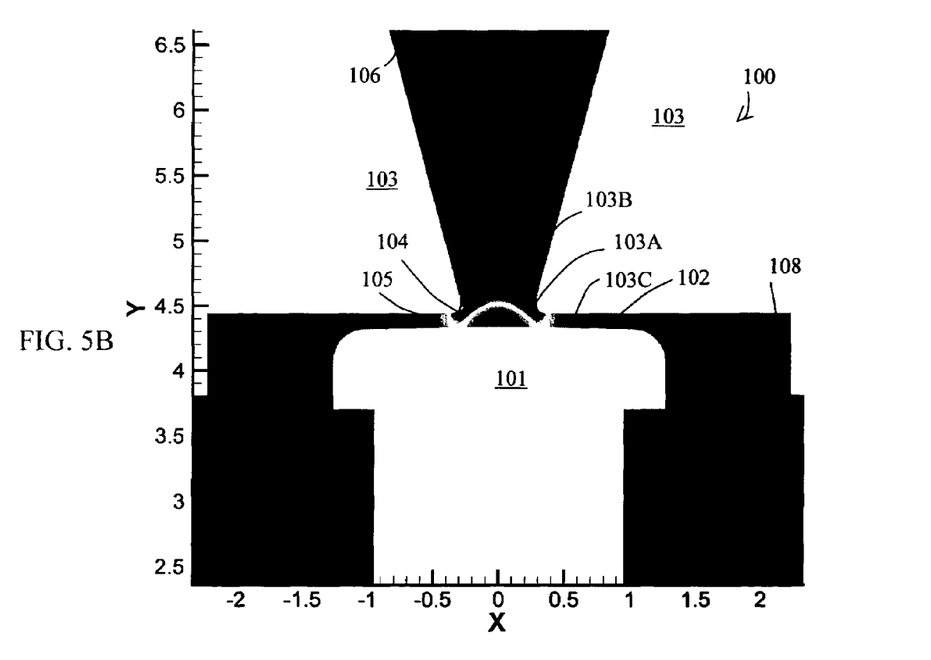
FIG. 5B is a CFD color graph of the pressure regions in the FCV according to the invention.
Figure 5C:
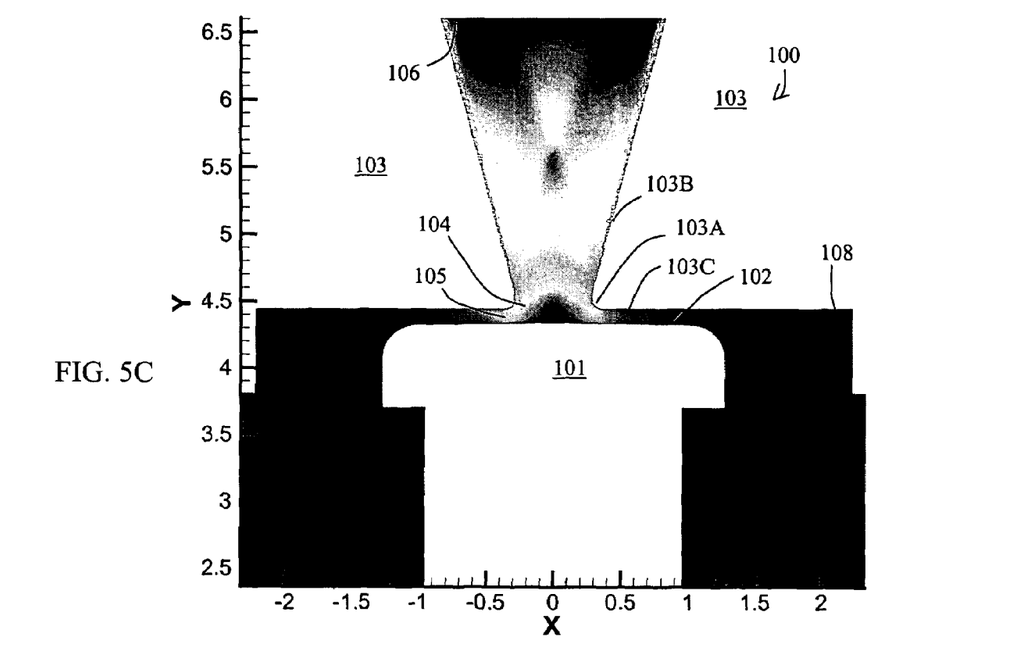
FIG. 5C is a CFD color graph of the Mach number distribution in the fluid flow in a FCV according to the present invention.
Figure 6:
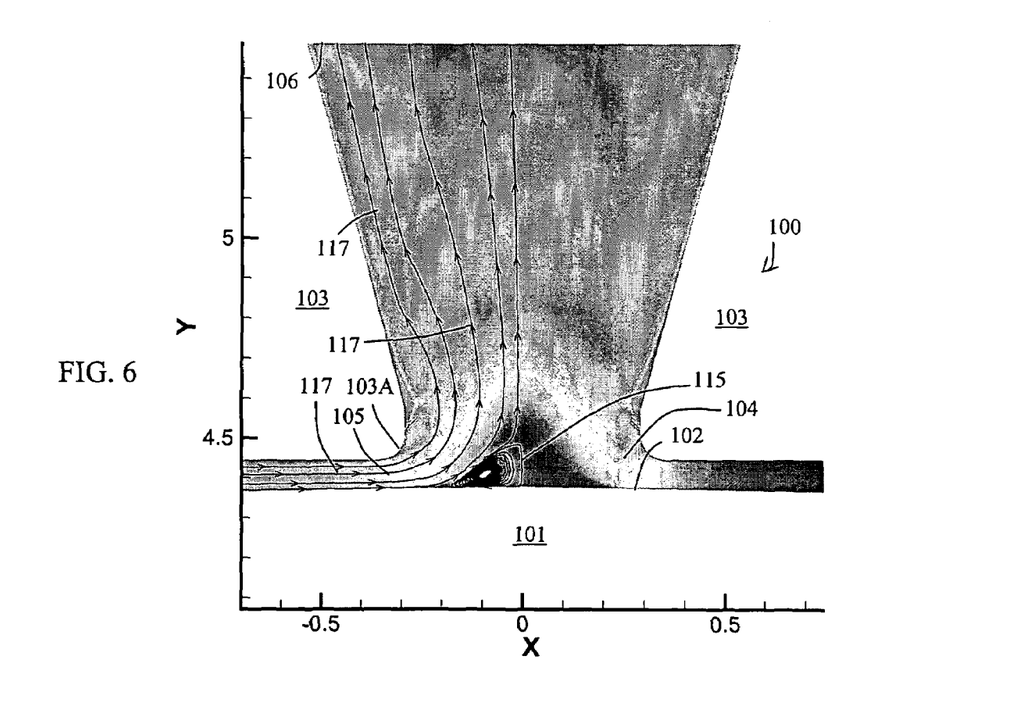
FIG. 6 is a CFD color graph of the temperature regions and the HCS formed below the FCS in the PNI of the Preferred Embodiment of the FCV.

FIGS. 4A and 4B illustrate the Preferred Embodiment of a fluent control valve (FCV) 100 according to the present invention. FIGS. 5A–6 are CFD color graphs that illustrate the temperature, pressure, and Mach conditions of flow during operation of the FCV 100. As shown in FIGS. 4A and 4B, the FCV 100 comprises a nozzle plate 103 and a fluid control plate 101 with a fluid control surface (FCS) 102. The nozzle plate 103 has a flat nozzle-plate surface 103C, a nozzle inlet 104 with a radiused nozzle inlet edge 103A, a flared wall 103B, and a nozzle exit 106. A throat region 105 forms between the FCS 102 and the nozzle-plate surface 103C as the FCV 100 opens. In the Preferred Embodiment shown, the nozzle plate 103 is fixed in position within a valve housing 114 and the fluid control plate 101 translates in a direction of operation indicated by arrow 116.

Fluid flows into a valve plenum 108 from a supply line under high temperature and high pressure and, due to a pressure differential across the FCV 100, flows across the nozzle-plate surface 103C radially toward the nozzle inlet 104. The velocity of the flow increases as a result of the area contraction ratio and then exceeds the velocity of sound as it flows through the smallest physical flow area of FCV 100 at the throat region 105. Then, as the area expands at the nozzle inlet 104, the flow becomes supersonic, turns 90 degrees in direction, and continues to increase in velocity toward the nozzle exit 106.

With reference to FIG. 4B, the FCS 102 is formed with some small angle, a. In the Preferred Embodiment, α is 1 degree relative to a plane that is parallel to a valve plane P of the FCV 100, indicated by dashed line P, so that a first distance Z1 between the FCS 102 and the flat nozzle-plate surface 103C is greater than a second distance Z2 between the FCS 102 and the inner most edge of flat nozzle-plate surface 103C where 103C meets with nozzle inlet radius 103A. The difference between Z1 and Z2 may be on the order of a thousandth of an inch, depending upon design.

The area contraction ratio of the fluid control plate 101 and the nozzle plate 103 is equal to:

$$CR = \frac{\int_0^{2\pi} dA2}{\int_0^{2\pi} dA1} = \frac{A2}{A1} = \frac{(2\pi R2)Z2}{(2\pi R1)Z1} = \frac{R2Z2}{R1Z1}$$

The FCV 100 requires less energy to open than the traditional pintle valve because, due to difference in distance between Z1 and Z2, fluid remains present at line pressure for some small distance at the outer perimeter between the nozzle-plate surface 103C and the FCS 102 when the FCV 100 is closed. Because of the pressure differential across the FCV 100, the fluid provides immediate enhancement of the opening movement when the FCV 100 begins to open. As mentioned earlier, in the Preferred Embodiment, the fluid control plate 101 translates in the direction of operation 116 while the nozzle plate 103 remains stationary. It is within the scope of the invention, however, to construct a fluent control valve 100 according to the invention in which both the fluid control plate 101 and the nozzle plate 103 translate in the direction of operation 116, in order to reduce time required to open the fluent control valve.

The very slight angle α of the FCS 102 introduces virtually no obstruction into the flow stream and, since the fluid is equally balanced in all directions, fluid separation and/or turbulence is nearly nonexistent. Consequently, flow losses (pressure drop) across the FCV 100 are substantially smaller than those in traditional pintle valves. In addition, skin friction and heat transfer to surfaces on the fluid control plate 102 and the nozzle plate 103 are significantly reduced. Further, it has been found experimentally that the mass flow through the FCV 100 is linear with valve opening. This is another indication that recirculation and flow separation within the FCV 100 are nearly non-existent.

In both the traditional pintle valve 10 and the FCV 100 according to the present invention, the fluid dynamic throat 5A or the throat region 105, respectively, leads into the corresponding nozzle inlet 4 or 104. A comparison of FIG. 5A with FIGS. 2A and 3A illustrates that the transition in the fluid flow from a very high temperature to a lower-temperature begins higher upstream in the throat region 105 in the FCV 100 than happens with the fluid dynamic throat 5A of the traditional pintle valve 10. The radiused edge 103A of the nozzle 103 is the part of the nozzle that is most susceptible to material ablation resulting from rapid transfer of high heat. Thus, effectively moving the temperature transition region upstream of the radiused edge 103A significantly reduces the amount of heat that is transferred to the radiused edge 103A in the nozzle 103 of the FCV 100, and thus, reduces the amount of material ablation. A similar shift in the transition area of a high pressure to lower pressure in the fluid flow can be seen when comparing FIG. 5B with FIGS. 2B and 3B. The transition from a very high pressure to a lower pressure begins upstream from the radiused edge 103A in the FCV 100, whereas, in the traditional 45-degree pintle valve 10, the transition occurs right at the radiused edge. The combined lower temperature and lower pressure at the radiused edge 103A in the FCV 100 significantly reduces the amount of material ablation and, therefore, improves significantly the operational life and the performance of the FCV 100.

FIG. 6 illustrates the formation of a hydrodynamic "pintle" or hydrodynamic control surface (HCS) 115 that effectively turns the fluid 90 degrees toward the nozzle exit 106. As the fluid flows through the throat region 105, the fluid momentum is radially balanced and directed toward the center of the nozzle inlet 104. In the nozzle inlet 104, the fluid collides with fluid entering the inlet 104 from other sides and a fluid-fluid interaction occurs. As is illustrated by flow lines 117 the HCS 115 forms in the center of the nozzle inlet 104, shown just above the FCS 102. (Only one-half of the HCS 115 is shown in FIG. 6, extending from the center of the FCV 100 to the minus side on the X-axis. In reality, a mirror-reversed HCS 115 extends equally into the positive side.) Because the flow is redirected in a fluid-fluid interaction, rather than a fluid-solid interaction that occurs when using a solid pintle, shear stresses on the fluid in the redirection process are minimal and, consequently, kinetic energy losses to friction and shearing are significantly reduced. In addition, the fluid-fluid interaction eliminates impingement of particles in the high velocity fluid on the solid surface of the nozzle 103 and FCS 102 of the Preferred Embodiedment. This drastically reduces material erosion on both the fluid control plate 101 and nozzle 103 when compared to the pintle 12 of FIG. 1 and nozzle 11. The HCS 115 is an area of high temperature and high pressure that forms in the center of the nozzle inlet 104, well away from the walls and the radiused edge of the nozzle 103 and directly beneath the FCS 102. Because the FCS 102 of the FCV 100 is so flat and massive, it can well absorb the heat flux from the HCS 115 without the severe problems of material ablation that are so common with the traditional pintle valve 10.

As also shown in FIG. 6, the throat region 105 between the fluid control plate 103 and the fluid control plate 101 forms earlier in the flow path, well above the radiused nozzle inlet edge 103A. As a result, the temperature and pressure of the fluid is significantly lower at the radiused nozzle inlet edge 103A than is the case with comparable flow in the traditional pintle valve 10. For a comparison, see FIG. 2A. Again, lower temperature reduces the material stress at the nozzle inlet edge 103A, thereby increasing the operating life of the nozzle 104.

The Preferred Embodiment described herein is merely illustrative of the present invention. It should be understood that variations in construction of the present invention may be contemplated in view of the following claims, without straying from the intended scope and field of the invention herein disclosed.

What is claimed is:

1. A fluent control valve for supersonic flow, said fluent control valve comprising:
   a housing having an upper end that includes an inlet port and a valve plenum, and a longitudinal axis that extends from said upper end to said lower end;
   a fluid-control plate having a fluid-control surface (FCS) with a central control region and an FCS outer perimeter, said fluid-control plate being assembled in an upper portion of said housing;
   a nozzle having a nozzle plate at an upper nozzle end and a nozzle inlet with an inlet perimeter, and a discharge end with a nozzle exit, said nozzle being assembled in a lower portion of said housing;
   wherein said nozzle plate has a flat nozzle inflow surface and a nozzle outer perimeter;
   wherein said nozzle inflow surface defines a valve plane and said FCS has a slight valve angle relative to a plane that is parallel to said valve plane;
   wherein said fluid-control plate and said nozzle plate are translatable relative to one another along said longitudinal axis, so as to open and close a flowpath from said plenum through said nozzle, said flowpath having a converging section that leads directly into a diverging section;

wherein said slight valve angle on said fluid-control plate provides an inflow space between said FCS at said FCS outer perimeter and said nozzle inflow surface at said nozzle outer perimeter when said throat region is closed.

2. The fluent control valve of claim 1, wherein said nozzle inlet is a circular orifice and said inlet perimeter has a radiused nozzle-inlet edge between said converging section and said diverging section, wherein said fluent-control plate closes on said nozzle plate above said radiused nozzle-inlet edge, and wherein said nozzle has nozzle walls that flare outwardly between said nozzle inlet and said nozzle exit.

3. The fluent control valve of claim 1 further comprising a flowpath from said nozzle outer perimeter across said nozzle inflow surface into said nozzle inlet, wherein said flowpath includes a fluid pintle that is hydrodynamically variable and that forms adjacent to said central control region of said FCS, wherein said fluid pintle increases and decreases in size as a function of a fluid flow through said nozzle inlet, and wherein said fluid pintle provides a high pressure flow control barrier that redirects said fluid flow from a first flow direction that is parallel to said valve plane to a second flow direction that is approximately along said longitudinal axis toward said nozzle exit.

4. The fluent control valve of claim 3, wherein said flow control barrier is a dynamic high pressure fluid barrier.

5. The fluent control valve of claim 4, wherein said fluid pintle comprises a high-pressure region that deepens downward into said nozzle from said central control region of said FCS.

6. The fluent control valve of claim 5, wherein said flowpath is essentially free of obstruction by a solid construct.

7. A fluent control system for supersonic flow, said system comprising:

said fluent control valve (FCV) of claim 1; and a hydrodynamic fluid pintle having a variable shape;

a throat region that is formable between said FCS and said nozzle inflow surface upstream from said nozzle inlet radius;

wherein said flowpath is adaptable for said supersonic flow, said throat region providing a transition region for significantly reducing a physical property of a fluid from a high level to a lower level before said fluid reaches said nozzle inlet and said radiused nozzle-inlet edge; and wherein said variable shape of said hydrodynamic fluid pintle adapts to an opening or closing of said FCV and provides a fluid-fluid control barrier for re-directing said flowpath toward said nozzle exit.

8. The fluent control system of claim 7, wherein said physical property is temperature.

9. The fluent control system of claim 7, wherein said physical property is pressure.

10. The fluent control system of claim 7, wherein a radius of said nozzle inlet is dimensioned to minimize fluid losses and heat transfer in said nozzle.

* * * * *